United States Patent [19]
Schuster et al.

[11] 3,891,325
[45] June 24, 1975

[54] MUCUS SAMPLING AND MEASURING SYSTEMS, DEVICES AND PROCESSES

[75] Inventors: Samuel R. Schuster, Wellesley; Louis Kopito, Brookline, both of Mass.

[73] Assignee: Ovutime, Inc., Wellesley, Mass.

[22] Filed: Sept. 20, 1973

[21] Appl. No.: 399,145

[52] U.S. Cl. .............. 356/205; 250/574; 356/36; 356/103
[51] Int. Cl. .......................................... G01n 21/24
[58] Field of Search ............ 356/36, 201, 205, 208, 356/103, 244; 128/2 R, 2 A; 250/573, 574, 576

[56] References Cited
UNITED STATES PATENTS

| | | | |
|---|---|---|---|
| 1,940,373 | 12/1933 | Schoenberg | 250/573 X |
| 2,062,588 | 12/1936 | Logan et al. | 356/208 X |
| 2,597,425 | 5/1952 | Aiken et al. | 356/36 |

Primary Examiner—Ronald L. Wibert
Assistant Examiner—Matthew W. Koren
Attorney, Agent, or Firm—Morse, Altman, Oates & Bello

[57] ABSTRACT

A mucus sample is positioned between a pair of plates, at least one of which is transparent, at specific pressure and temperature in order to provide a specimen of predetermined thickness for measurement of optical transmissivity and/or diffusivity as an indication of phase of the menstrual cycle.

12 Claims, 8 Drawing Figures

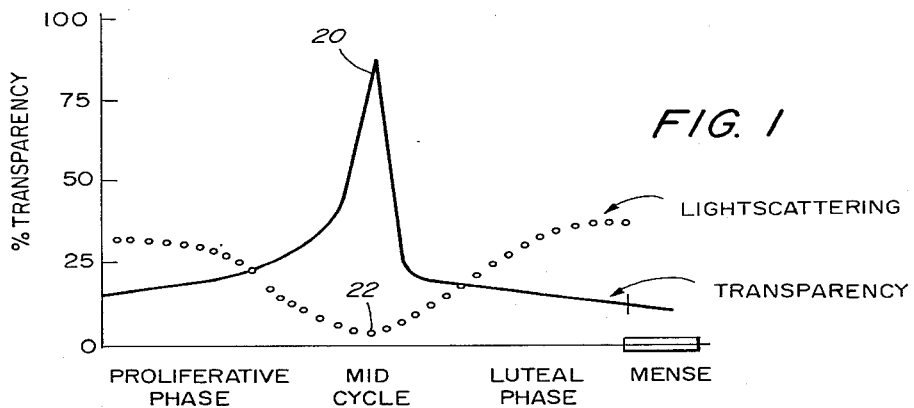
FIG. 1
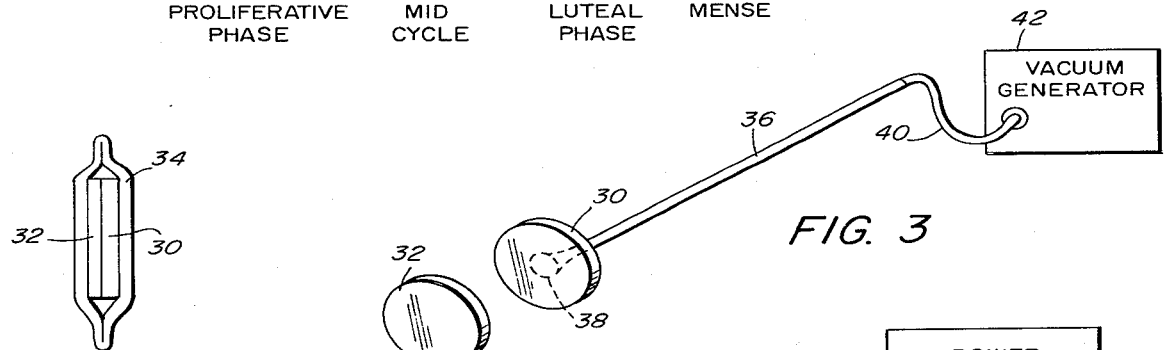
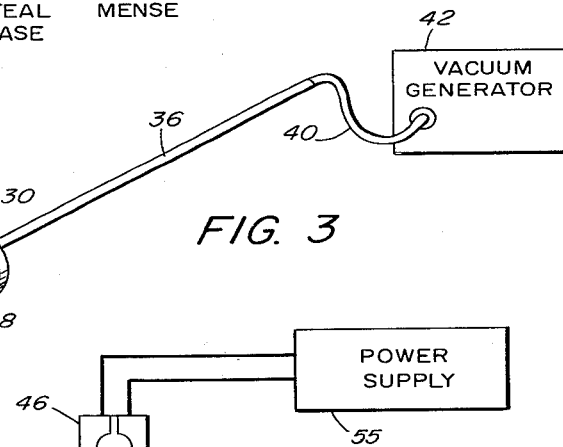
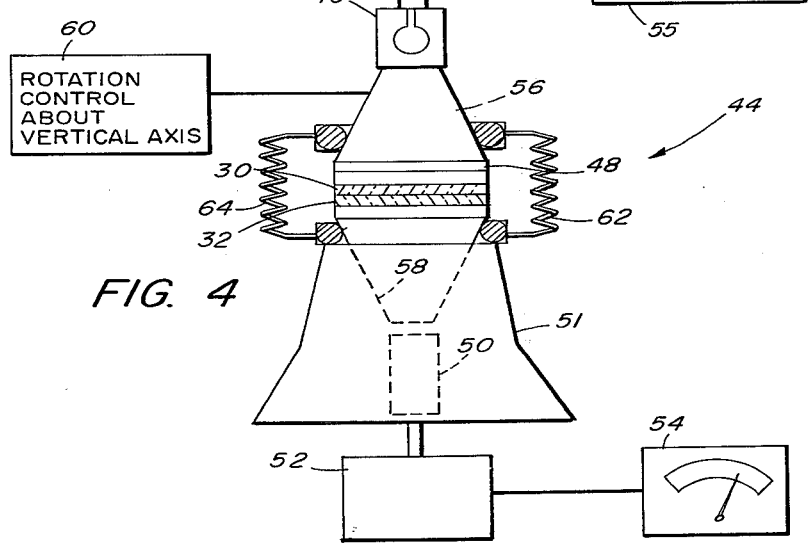

MUCUS SAMPLING AND MEASURING SYSTEMS, DEVICES AND PROCESSES

BACKGROUND OF THE INVENTION

The present invention relates to systems, processes and products for determining phase of the menstrual cycle and particularly to measurement of transparency and/or diffusivity of bodily mucus, particularly cervical and/or oral mucus in order to predict the onset and to indicate the presence of ovulation. The present invention thus is concerned with conception control. It has been found that mucus sampled from the vaginal and oral cavities undergoes distinct physical and chemical changes during the menstrual cycle.

For example, cervical mucus, a hormonally controlled secretion, is produced continuously, varying in quantity, composition and physical properties during the menstrual cycle. In the cervical canal, the anatomic connection between the vaginal lumen and the uterine cavity, the mucus secreted by the cervical glands acts as a mechanical and biochemical barrier against intruding organisms, including male spermatozoa. During the preovulatory phase, under estrogen domination, the mucus is profuse, watery, optically clear, alkaline and favorable to sperm penetration. During the postovulatory, progestational phase, the mucus changes remarkably becoming less abundant and fluid, more optically opaque, and less alkaline or slightly acidic. During this phase, the cervical mucus, which contains an increased number of leukocytes and other cellular components, is practically impenetrable to spermatozoa. In healthy women with normal menstrual cycles, as is well documented in the medical literature, ovulation usually occurs between the 12th and 14th day prior to the next menstrual period. Predicting ovulation on the basis of the preceding menstrual period by counting the number of days elapsed between the end of the period and the presumed mid-cycle ovulatory phase (the rhythm method) is prone to errors because of the great variability of this measurement. It is possible to predict ovulation on the basis of hormonal change in the blood and chemical and physical changes in the mucus but present procedures for analyzing such changes are useful only in special cases, because of the laboratory time and high cost required to perform analyses, which may take from several days to two weeks. By the time the results are available to the gynecologist, about half of the menstrual cycle may have elapsed. At the present time, there are no known reliable on-the-spot techniques capable of providing the information necessary for prediction or confirmation of ovulation during or immediately after examination of a patient.

SUMMARY

It is known that several optical properties of cervical mucus change considerably during the menstrual cycle. These properties include index of refraction, color, birefringence, transparency (transmittance) to white light, and to light of selected wavelengths, and diffusivity. The most important single factor determining the degree of transparency of mucus is water concentration. The mucus is most hydrated at the time of ovulation, containing 97 to 98 percent water. At other times during the menstrual cycle, the mucus is relatively dehydrated, containing only 80 to 90 percent water. The solids or non-volatile residue remaining in the mucus after desiccation may range from 2 percent to 20 percent of the weight of fresh mucus, representing as much as a 10 fold increase between the time of ovulation and other periods in the cycle. The solid residue consists primarily of proteins, salts, carbohydrates, lipids, exfoliated cellular elements and other organic materials, such as bacteria. The major mucus fraction is a carbohydraterich glycoprotein, which accounts for 70 to 80 percent of the dry residue. The remaining fraction essentially includes 20 to 30 percent aminoacid residues, as well as sodium chloride and other inorganic salts. Protein concentration varies considerably during the menstrual cycle, ranging from about 40 to 50 mg/gram during the proliferative and luteal phases to about 3.5 mg/gm at ovulation. Electron-microscopic studies of cervical mucus show that, at mid-cycle, mucus consists primarily of clusters of globular particles, 1000 to 1500 A in diameter, connected by thin string-like strands of material. In the early luteal phase, these mucus strands are considerably enlarged to about 200 A in diameter, creating an interlocking mesh without spherical components. It is believed that the change in structure that accompanies decrease in protein concentration at mid-cycle, coupled with an increase in water, renders the mucus transparent at that time. At other times during the menstrual cycle, the mucus becomes increasingly opaque as a function of the concentration of proteins and cellular debris. In order to utilize the foregoing for the purpose of determining ovulation, it is necessary to determine the exact time at which the mucus reaches maximum transparency.

The primary object of the present invention is to provide processes, products and devices, involving obtaining a suitable mucus sample, positioning the mucus sample between a pair of plates at specific pressure and temperature in order to provide a specimen of predetermined thickness, and utilizing the transmittance and/or diffusivity under selected conditions in order to indicate menstrual cycle phase.

Other objects of the present invention will in part be obvious and will in part appear hereinafter.

The invention accordingly comprises the processes, products and devices, together with their steps, parts, components and interrelationships, which are exemplified in the present disclosure the scope of which will be indicated in the appended claims.

BRIEF DESCRIPTION OF DRAWINGS

For a fuller understanding of the nature and objects of the present invention, reference is made to the following detailed description which is to be taken in connection with the accompanying drawings, wherein:

FIG. 1 is a graph illustrating certain principles of the present invention;

FIG. 2 illustrates, in cross section, a product useful in accordance with the present invention;

FIG. 3 illustrates, in perspective, a device for applying the product of FIG. 2;

FIG. 4 is a schematic view of a device for performing certain steps in accordance with the present invention;

DETAILED DESCRIPTION

Figure 5:
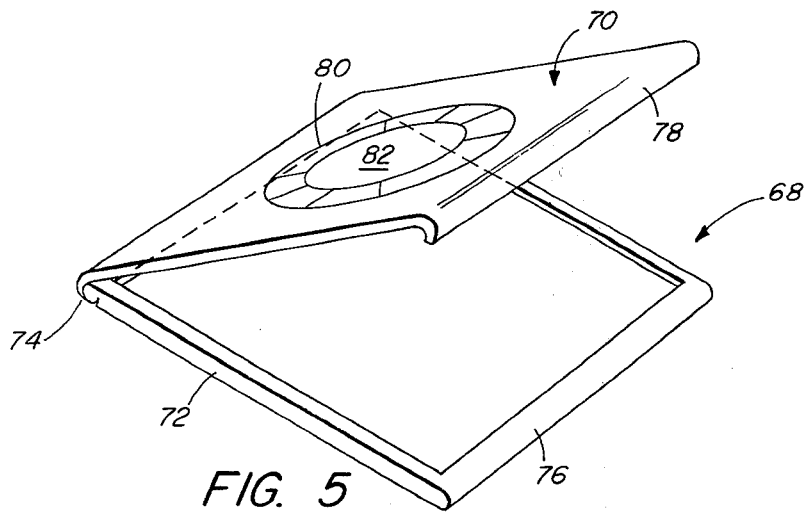
FIG. 5 is a perspective view of another product of the present invention, in inoperative condition.

The graph of FIG. 1 illustrates certain properties of cervical mucus during the typical menstrual cycle of a normal woman, showing peak transparency 20 at ovulation. At the same time, the minimum amount of light scattering 22 results from the reduced presence of cellular material. During the proliferative phase, the transparency of the mucus increases gradually until three or four days before ovulation when more rapid day to day increases occur. The maximum transparency is reached on the day of ovulation when the mucus is nearly 90 percent transparent to white light. A sharp increase in opacity occurs one or two days following ovulation and continues at a much slower rate during the remainder of the cycle. These physio-optical changes in cervical mucus in the past, have been detected by simple visual estimation.

FIGS. 2, 3 and 4 illustrate a preferred system incorporating the present invention. Mucus specimens are collected on a flat glass disc 30, typically 1 to 1.5 mm thick and 15 to 20 mm in diameter. This disc, together with a mating disc 32, are supplied in a sterilized hermetic package 34 composed, for example of waxed paper or plastic. After ripping open package 34, disc 30 is held by a hollow stainless steel tube 36, which is easily sterilizeable, that is equipped with a suction cup 38 at one end and a hose 40 at the other end, connected to a vacuum generater 42. Mucus then is obtained by pressing and rotating disc 30 lightly against the cervical os. Disc 32 then is superposed on and pressed against disc 30 with the mucus sample therebetween, the time lapse between obtaining the mucus sample and pressing it between the discs being no more than 30 seconds in order to prevent evaporation and contamination. The superposed disc and mucus sample assemblage now is placed inside the special photometer assembly of FIG. 4.

The photometer assembly of FIG. 4, generally shown at 44, comprises a light source 46, a light filter 48 to transmit slected wave lengths, and a detector 50 to provide electronic signals for amplification at 52 and display at 54. Light source 46 is controlled by a suitable power supply 55. In accordance with the present invention, a conical fiber optic bundle 56 serves as a diverging collimator and a conical fiber optic bundle 58 serves as a converging decollimater. A housing 51 is provided to shield detector 50 from stray light. The use of fiber optics rather than conventional optics has the following advantages: the light source is located at a fair distance away from the measuring head, thereby preventing heating of the specimen by which its physical composition might be changed; the matching surfaces of the fiber optic devices are selected in a manner to provide maximum resolution for the detection of cellular components. For example, an assembly of 20 micron fibers will resolve 22 lines/mm while an assembly of 6 micron fibers will resolve 90 lines/mm. By relatively rotating the faces of the fiber optic bundles 56, 58, by a suitable control 60, the fibers may be registered to provide maximum transmission, de-registered to provide minimum transmission, or adjusted to provide intermediate transmission. When assemblage 30, 32 is in position between the faces of fiber optics bundles 56, 58, these two faces are pressed against the opposite faces of the assemblage by biasing springs 62, 64, which exert a uniform pressure between the discs ranging from 3 to 30 pounds per square inch. It has been found that, within this pressure range and at a temperature range of between 60° to 100°F., the mucus film reaches a balance between surface tension and edgewise pressure, at which the thickness of the mucus sample falls within the range of 0.005 to 0.2 mm. The thickness of the mucus sample thereby is standardized in order to ensure meaningful data.

Figure 6:
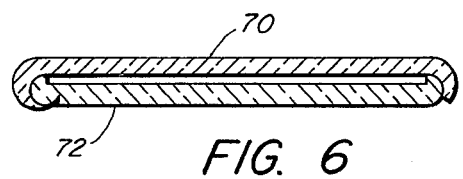
FIG. 6 is a cross-sectional view of the product of FIG. 5, in operative condition.

An alternative product embodying the present invention is shown in FIGS. 5 and 6 as comprising as assemblage 68 of a pair of plates 70, 72, which are composed, for example, of a polymer such as methyl methacrylate. Plates 70, 72 are pivoted to each other at one edge 74 of the assemblage. At the opposite end, plate 72 has a rounded extremity 76 and plate 70 has a hooked extremity 78. Hooked extremity 78 and manual extremity 76 are mated so that the two plates manually can be snapped into locked condition with inner faces in contiguity or snapped into open condition with inner inner faces apart. The inner face of plate 72 has a slight planar depression, ranging in depth from 0.005 to 0.2 mm for the reception of a mucus sample. The inner face of plate 70 has an annular sequence of light absorbing areas 80 surrounding a clear area 82. Areas 80 are characterized by incremental absorptivities so that when the plates are snapped into closed operative condition with a mucus sample therein, visual comparison of the absorptivity of the sample, as seen through clear region 82, with the incremental absorptivities of areas 80 enable a determination of approximate absorptivity of the sample by transmitted or reflected light.

Figure 7:
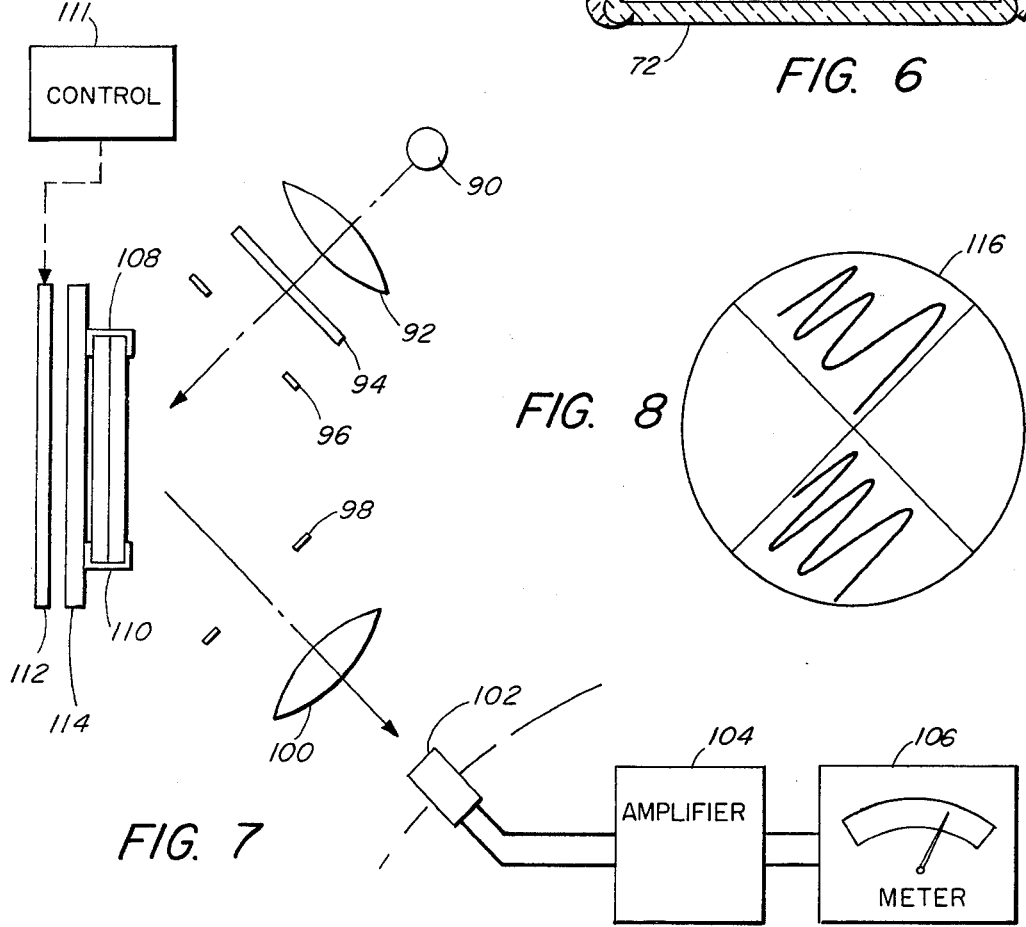
FIG. 7 is a schematic view of another device for performing certain steps in accordance with the present invention.
Figure 8:
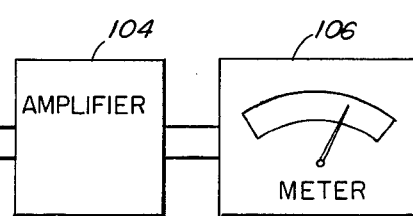
FIG. 8 is a plan view of a component of the device of FIG. 7.

The system of FIG. 7 is based on the following considerations. Because cellular material is nearly absent in cervical mucus just at the time of ovulation and because it is present at other times during the cycle, it is possible to enhance the determination of transparency by also measuring light scattering. It is estimated that light scattering of the mucus is about 2 percent to 5 percent at mid cycle while at pre-and post-ovulatory periods it may amount in excess of 30 percent. Thus, measuring light scattering alone may provide a range of about 15 to 1 whereas the measurement of absolute transparency may provide a range of about 5 to 1. Using both measurements together enhances the overall result and provides, without additional sampling, a double indication of ovualtion by two nearly independent variables. All of the components of the system of FIG. 7 are enclosed within a suitable housing (not shown).

FIG. 7 shows a spectrophotometer that is designed to measure the quantity of light transmitted through the specimen as well as the amount of scattering produced by the presence of cellular components. The two measurements are taken without removing the sample cell from the spectrophotometer. The illuminating subassembly includes a light source 90, a collimating lens 92, a selected band pass filter 94, and an adjustable aperture 96. The detecting sub-assembly comprises an adjustable aperture 98, a collimating lens 100, a detector 102, an amplifier 104, and a meter readout 106. The sample assemblage is collected between two glass discs (described previously in connection with FIGS. 1, 2 and 3), which are spring pressed together by spring clips 108, 110 in order to achieve reproducible thickness. The sample assemblage is backed by a mirror 112.

The meter is calibrated to read from 0 percent to 100 percent, using a reference set of glass discs at position 114 without the sample cell in position. After calibration, the sample cell is inserted and the amount of light transmitted is read. Then, under a control 111, mirror 112 is rotated out of the optical path and a second reading, that of the energy reflected by scattering is taken. The final value is a function of the ratio of the two readings as follows:

Light transmitted (T)/Light scattered (S) = resultant value

At ovulation the light transmitted (T) is at maximum, the mucus being most transparent at that time and the light scattered (S) is minimal at ovulation. Hence the resultant value of the ratio of the two (T/S) yields a relatively large number, typically 90/2=45. At other times during the cycle the mucus is relatively opaque and the quantity of cellular material is high. Hence T/S yields a relatively small number, typically 10 to 80/5 to 30 = 1/3 to 16.

In one embodiment, the photometer of FIG. 7 may be programmed to yield a single relative value of T/S at optimal conditions. This value ordinarily ranges from 80 to 100 ovulation and from 0.5 to 35 or 50 at other times. These values are arbitrary indicators designed to give maximum separation between approaching ovulation, the actual event, and confirmation, one day later. As an added refinement, a chopper 116 may be introduced to replace mirror 112, yielding an AC signal. This mirrored chopper provides two measurements of scattering and two measurements of transparency per cycle. The resulting signal is processed to yield the T/S value described above. This signal is recorded on a time basis to obtain another value relating to the evaporation of the water from the mucus under controlled conditions. At mid-cycle, the mucus contains more water than at the other times so that the decay curve will be of longer duration. At other times in the cycle the decay curve will be of lesser duration.

The present invention departs from previous theories which stress the need for measuring "true" physical properties such as the index of refraction. The present device is not intended primarily to produce a physical measurements relating to homogenous fluids. Instead, the property measured by the present system utilizes biological changes which contribute to the non-ideal physical properties of cervical mucus, i.e., cellular inclusions and ultrastructural changes induced by the polymerization of the glycoproteins, all of which differentiate the phase of ovulation from other phases of the menstrual cycle. Hence, the property actually measured, expressed in a numerical value not related to a defineable single physical concept, is related to a sum total of most of the interacting physiochemical events. Acting together, these events create a complex material of predictable optical behavior during the menstrual cycle. The instrument in various forms is designed to give a numerical value in the range of 0 to 100 (or higher if necessary) to provide the practical means for sensing oncoming ovulation and pin-pointing this event. It takes advantage of the wide range of optical properties of the mucus, from near complete transparency with little scattering at ovulation to reduced transparency with considerable scattering of light at other times during the menstrual cycle.

Since certain changes may be made in the present disclosure without departing from the scope of the invention thereof, it is intended that all matter described in the above specification or shown in the accompanying drawings be interpreted in an illustrative and not in a limiting sense.

What is claimed is:

1. A system for determining the phase of a menstrual cycle for use with a first plate and a second plate, said system comprising first means for contacting one face of said first plate with a sample of bodily mucus, second means for uniformly applying a pressure across said first plate and said second plate when superposed to produce a mucus stratum between said faces, at least one of said plates being at least partially transparent to certain radiation, and third means for transmitting said radiation through one of said plates and said mucus stratum in order to produce a signal functionally related to absorptivity of said mucus stratum with respect to said radiation.

2. A process for determining the phase of a menstrual cycle, said process comprising the steps of contacting a face of a first plate with a sample of bodily mucus, superposing a face of a second plate on said face of said first plate and uniformly applying a pressure across said plates ranging from 3 to 30 pounds per square inch to produce a mucus stratum between said faces, at least one of said plates being at least partially transparent to certain radiation, transmitting said radiation through said one of said plates and said mucus stratum in order to produce an indication functionally related to absorptivity of said mucus stratum with respect to said radiation, and processing said indication to a form representative of said phase of said menstrual cycle.

3. The process of claim 2 wherein said mucus is cervical.

4. The process of claim 2 wherein said plates are substantially transparent.

5. The process of claim 2 wherein the other of said plates is associated with a reflector backing said plates.

6. The process of claim 1 wherein said indication functionally related to absorptivity is a function of the ratio of absorptivity to diffusivity.

7. A system for determining the phase of a menstrual cycle for use with a first plate and a second plate, said system comprising first means for contacting one face of said first plate with a sample of bodily mucus, second means for uniformly applying a pressure across said first plate and said second plate when superposed, said pressure ranging from 3 to 30 pounds per square inch to produce a mucus stratum between said faces, at least one of said plates being at least partially transparent to certain radiation, and third means for transmitting said radiation through one of said plates and said mucus stratum in order to produce a signal functionally related to absorptivity of said mucus stratum with respect to said radiation.

8. The system of claim 7 wherein said first means includes a vacuum cup for contacting said first plate, a probe having a conduit communicating with said vacuum cup, a vacuum pump communicating with said conduit.

9. The system of claim 7 wherein said second means includes resilient spring means.

10. The system of claim 7 wherein said third means includes a light source, a diverging fiber optical bundle extending from said light source to said pair of plates, a detector, and a converging fiber optics bundle extending from said pair of plates to said detector.

11. The system of claim 7 wherein said third means includes a light source path obliquely disposed with respect to said pair of plates, a removable reflector backing said plates, and a detector path obliquely disposed with respect to said pair of plates.

12. The system of claim 11 wherein said reflector is moving and has alternate absorbing and reflecting regions in order to constitute a chopper.

* * * * *